Dec. 11, 1923.

F. C. LEONARD 1,476,718

AUTOMATIC CONTROLLING VALVE

Original Filed April 10, 1914    4 Sheets-Sheet 1

Dec. 11, 1923.

F. C. LEONARD

AUTOMATIC CONTROLLING VALVE

Original Filed April 10, 1914  4 Sheets-Sheet 2

1,476,718

Inventor.
Frederick C. Leonard,
By Hilmarth H. Thurston,
Attorney.

Dec. 11, 1923.
F. C. LEONARD
1,476,718
AUTOMATIC CONTROLLING VALVE
Original Filed April 10, 1914  4 Sheets-Sheet 3
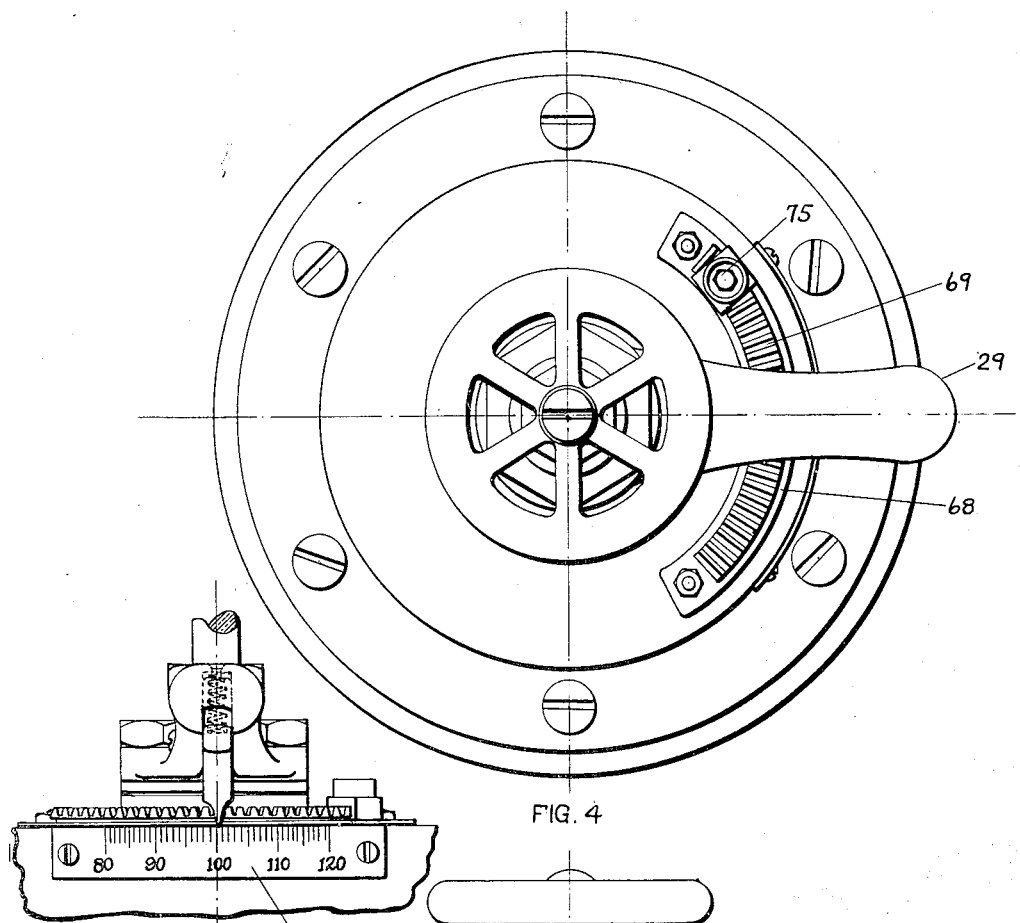
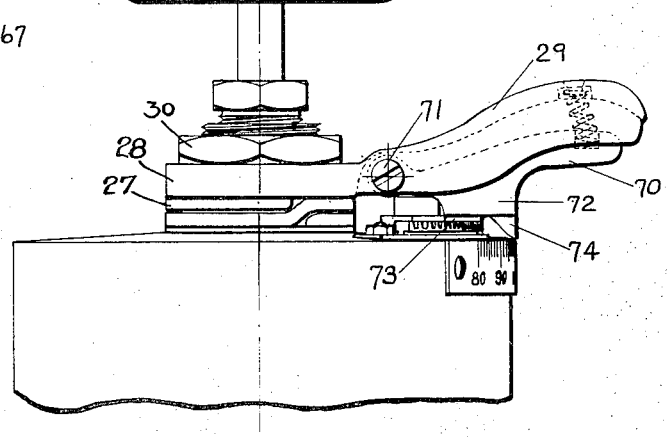

Dec. 11, 1923.

F. C. LEONARD 1,476,718

AUTOMATIC CONTROLLING VALVE

Original Filed April 10, 1914    4 Sheets-Sheet 4

Witnesses
J. H. Thurston
E. C. Alford

Inventor,
Frederick C. Leonard,
By Wilmarth H. Thurston,
Attorney.

Patented Dec. 11, 1923.

1,476,718

UNITED STATES PATENT OFFICE.

FREDERICK C. LEONARD, OF PROVIDENCE, RHODE ISLAND, ASSIGNOR TO LEONARD-ROOKE COMPANY, OF PROVIDENCE, RHODE ISLAND.

AUTOMATIC CONTROLLING VALVE.

Application filed April 10, 1914, Serial No. 831,083. Renewed March 29, 1919. Serial No. 286,079.

*To all whom it may concern:*

Be it known that I, FREDERICK C. LEONARD, of the city and county of Providence and State of Rhode Island, have invented certain new and useful Improvements in Automatic Controlling Valves; and I hereby declare the following specification, taken in connection with the accompanying drawings, forming a part of the same, to be a full, clear, and exact description thereof.

The object of the present invention is to provide a controlling valve for use in connection with fluid supplies of different temperatures, as in the case of bath-tubs, shower-baths and the like, for automatically controlling or regulating the temperature of the fluid to be delivered therefrom.

The present invention relates to certain improvements upon the controlling valve shown and described in my pending application, Serial No. 568,966, filed June 27, 1910.

One feature of the present invention consists in connecting the thermostat directly to the fluid valves, whereby said valves will be directly operated or controlled by the thermostat.

The invention further consists in the combination with the fluid valves of means for retarding the movements of said valves, whereby the movements of said valves will be gradual and steady instead of sudden or fluctuating.

The invention further consists in locating the outlet port of the controlling valve, as well as the inlet ports, in the base of the valve structure, whereby the casing which encloses the operating mechanism may be removed and access to such mechanism may be had without disconnecting any of the pipes, either the supply pipes or the discharge pipe, and without disturbing the valve structure proper, which may remain in position attached to the supply and discharge pipes.

The invention further consists in providing means for causing the fluid entering through the inlet port or ports to flow upward through the thermostat coils and thence downward through a separate passage to the outlet port in the base of the structure.

The invention further consists in certain combinations and arrangements of parts hereinafter described and claimed.

Referring to the drawings—

Fig. 4 is a top plan view of the valve structure.

Figs. 5 and 6 are details.

Figure 1:
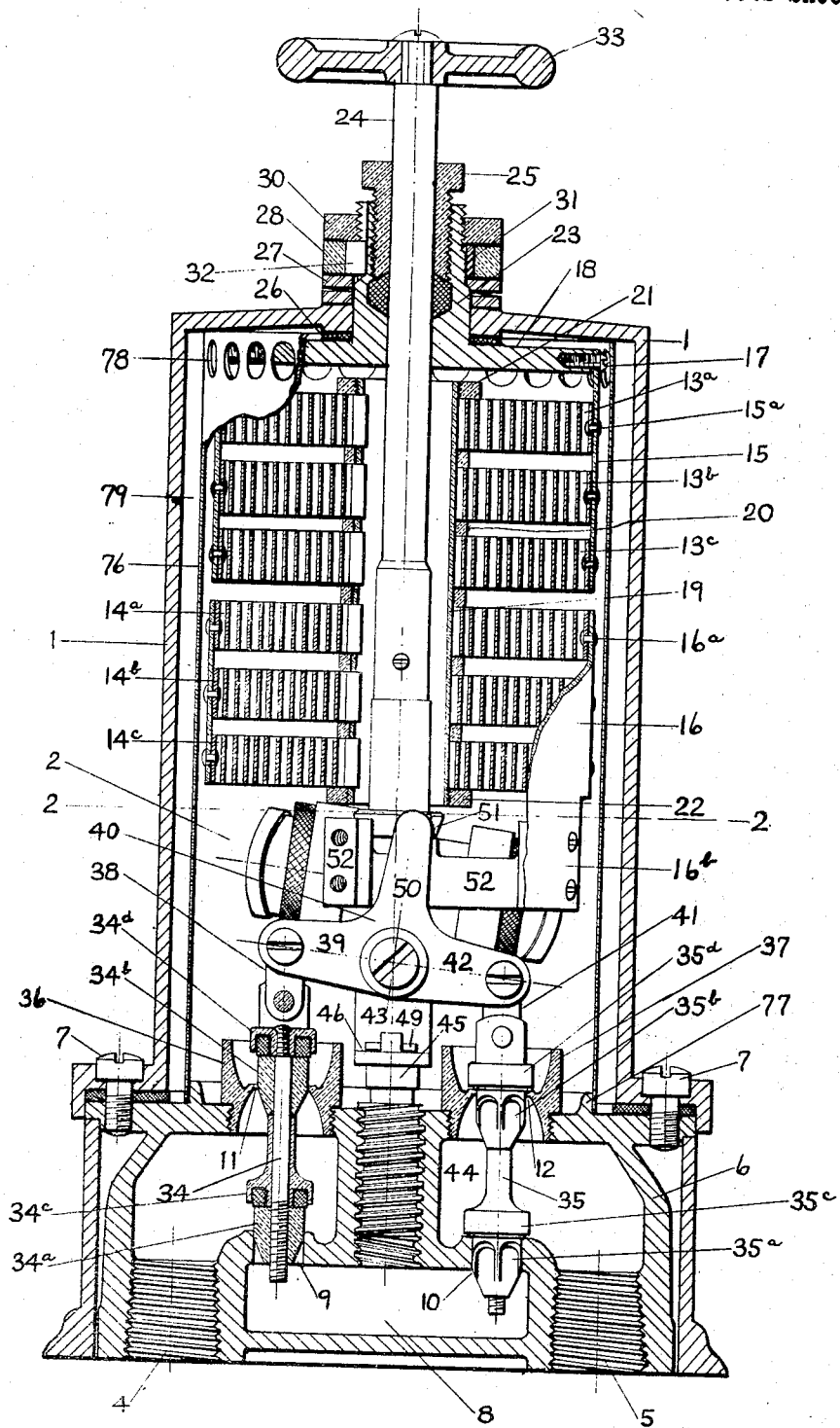
Fig. 1 is a central vertical section of a valve structure embodying the invention.

Referring to the drawings, the valve structure embodies a casing 1 having a top preferably formed integral therewith, said casing forming the main chamber 2. In the construction shown the outlet opening 3, the hot water inlet 4 and the cold water inlet 5 are all formed in a base member 6. The base member 6 and the casing 1 are connected together by screws 7. As will be understood the discharge pipe will be screwed into the outlet opening 3 and the hot and cold water supply pipes will be screwed into the inlet openings 4 and 5 respectively, and the valve structure may be supported either by said pipes or upon a shelf or slab through which said pipes extend.

The base member 6 is provided with a central chamber 8 and with openings or ports 9 and 10 communicating with said chamber 8, the ports 9 when open being in communication with the hot water inlet 4, and the port 10 when open being in communication with the cold water inlet 5. Also communicating with the hot water inlet 4 is a port 11, while a corresponding port 12 communicates with the cold water inlet 5. These ports 11 and 12 both communicate with the main chamber 2 and the flow of water therethrough is controlled by the valves which are operated by the thermostat.

Within the main chamber 2 and thus in position to be acted upon by the water entering said main casing through the ports 11 and 12 is a thermostat. The thermostat shown in the drawings is a metal thermostat, consisting of a strip formed of two metals having different co-efficients of expansion, as for example brass and steel, such strip being wound in the form of a coiled spring with the steel on the inside of the coils and the brass on the outside thereof.

For the purpose of increasing the extent of movement produced by the thermostatic action it is preferred to employ a number of coiled springs of the character described. As shown in Fig. 1, six such coiled springs are employed, the same being arranged and connected to form two sets or sections of three each. The upper section 13 is composed of three coiled springs $13^a$, $13^b$ and $13^c$, and the lower section is likewise composed of three coiled springs $14^a$, $14^b$ and $14^c$. The three coiled springs forming the upper section 13 are all wound in one direction, while the three coiled springs forming the lower section 14 are all wound in the opposite direction. The three coiled springs $13^a$, $13^b$ and $13^c$ are each secured to a sleeve 15 by means of rivets $15^a$, by means of which sleeve the three springs are connected together to form one section of the thermostat. The three coiled springs $14^a$, $14^b$ and $14^c$ are likewise each connected to a sleeve 16 by rivets $16^a$, by means of which sleeve the three springs are connected together to form the other section of the thermostat. The sleeve 15 is extended upward and is secured by screws 17 to a bracket 18 preferably formed with four arms, two of which are shown in section in Fig. 1. The two sections 13 and 14 of the thermostat are connected together by a sleeve 19 centrally arranged as shown in Fig. 1. By means of this sleeve the movement of the upper section 13 is transmitted to the lower section 14. Preferably the several springs are separated from each other by interposed washers 20. The upper end of the sleeve 19 is screw-threaded to receive the nut 21, and the lower end of said sleeve is likewise screw-threaded to receive a nut 22. With this construction the sleeve with the interposed washers serves to hold the several coiled springs in position.

The four-armed bracket 18 is provided with an upwardly extending hub or sleeve 23. Extending through said hub or sleeve is a shaft 24 and said sleeve 23, in connection with a gland 25, forms a stuffing-box for said shaft. Preferably a packing 26 is placed between the bracket 18 and the under side of the top of the casing as shown in Fig. 1. Preferably also a spring 27 surrounds the hub or sleeve 23 above the top of the casing for the purpose, in connection with the other parts to be referred to, of holding and maintaining a tight joint at the packing 26. Surrounding the sleeve 23 above said spring is the hub 28 of an adjustable handle 29 to be hereinafter more particularly referred to. The upper end of said sleeve 23 is exteriorly screw-threaded to receive a clamp-nut 30, by which the parts above referred to are clamped in position. If desired the hub 28 of the handle 29 may be screwed directly to the sleeve 23. It is preferred, however, to employ a split-ring 31 interposed between the sleeve 23 and the hub 28 as shown in Fig. 1 and to provide the sleeve 23 with a key 32 adapted to enter the slot or opening between the ends of the split-ring 31, and to secure the hub 28 to said split-ring. By this construction the tension on the hub 28 and the handle 29 produced by the clamp-nut 30 and the spring 27 may be varied or adjusted by turning said clamp-nut 30. By reason of the key connection between the split-ring 31, to which the hub is secured, and the sleeve 23 said split-ring and the hub secured thereto may, under the action of the spring 27, follow the upward and downward movement of the clamp-nut 30 as the same is turned in one direction or the other, while at the same time the hub 28 will always be so connected to the sleeve 30 that when the handle 29 is turned said sleeve 30 and the parts connected thereto will be turned with said handle. A hand-wheel 33 is secured to the upper end of the shaft 34 for turning the same, for a purpose to be hereinafter described.

The ports 9 and 11 of the hot water inlet are controlled by a valve structure 34, and the ports 10 and 12 of the cold water inlet are controlled by a valve structure 35. Each of these structures comprises two valves and constitutes a balanced valve. Referring first to the valve structure 34, said structure embodies a valve $34^a$ in operative relation with the port 9, and a second valve $34^b$ in operative relation with the port 11. So also the valve structure 35 embodies a valve $35^a$ in operative relation with a port 10, and a second valve $35^b$ in operative relation with the port 12. The construction and arrangement of these valves is such that the valves $34^a$ and $34^b$ on the one hand and the valves $35^a$ and $35^b$ on the other constitute together a substantially balanced valve.

These valves are for the purpose of automatically controlling the flow of hot and cold water respectively, and thus for automatically regulating the temperature of the water to be delivered through the discharge outlet 3. For this purpose the valves $34^a$, $34^b$ and $35^a$ and $35^b$ are each in the form of tapering piston-valves as shown.

It is also desirable to provide means for entirely shutting off the flow of both the hot and cold water by hand, and for this purpose each of the valve structures 34 and 35 is provided with two additional valves, viz, the valves 34ᶜ and 34ᵈ in the one case and 35ᶜ and 35ᵈ in the other. Each of these last-named valves is a poppet valve, constructed to seat upon a valve-seat. In the case of the valves 34ᵈ and 35ᵈ the valve-seats therefor are formed respectively on screw-plugs 36 and 37, adapted to be screwed into the base member 6. Each of these screw-plugs is also provided with an opening of suitable size for the passage of the valves 34ᵇ and 35ᵇ as shown.

The valve structure 34 is connected by a link 38 to one arm 39 of an inverted T-lever 40, and the valve structure 35 is connected by a link 41 to the opposite arm 42 of said lever as shown in Fig. 1.

Figure 2:
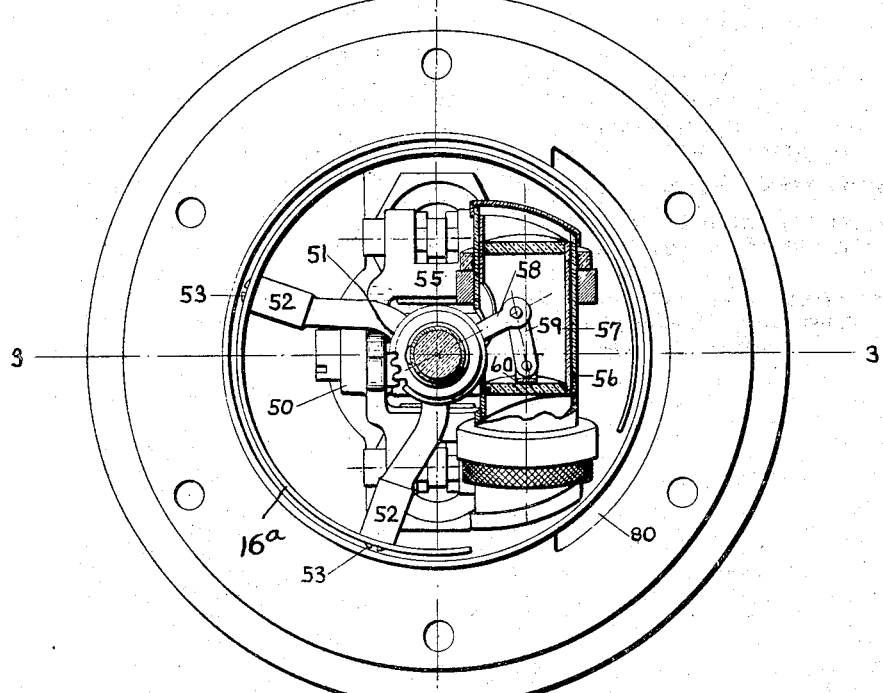
Fig. 2 is a horizontal section on the line 2—2 of Fig. 1.
Figure 3:
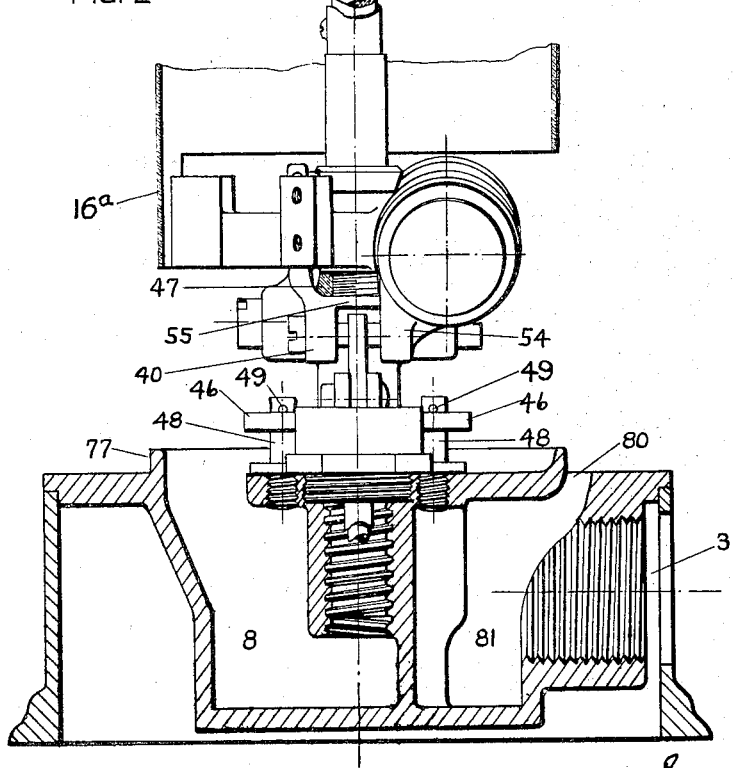
Fig. 3 is partly a side view of the part shown in Fig. 2 and partly a section on the line 3—3 of Fig. 2.
Figure 7:
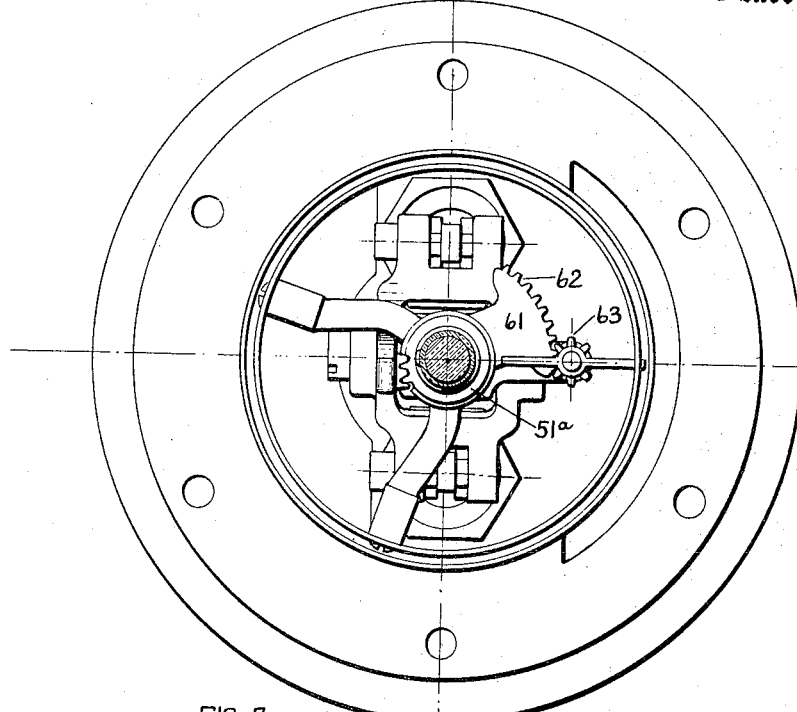
Fig. 7 is a view corresponding to Fig. 2, but showing a modified form of retarding means.

The T-lever 40 is pivoted to a sleeve 43 which surrounds the shaft 24. The lower end of the shaft 24 is provided with a screw-thread which engages an interior screw-thread formed in the central boss 44 of the base, and so that by turning said shaft 24 in one direction or the other said shaft will be moved up or down as the case may be. The sleeve 43 is mounted on the shaft 24 so as to partake of the up and down movements thereof. To this end the shaft 24 is provided with a shoulder or flange 45 and the sleeve 43 is provided with a projection 46 arranged to abut against said shoulder 45. At the upper end of said sleeve 43 the shaft 24 is screw-threaded for a short distance so that a clamp-nut 47 may be screwed on the shaft, thereby clamping the sleeve 43 between said clamp-nut and the shoulder 45. As shown in Fig. 3 there are two projections 46 on the sleeve 43 arranged on opposite sides of said sleeve. Studs 48, 48 are secured in the base 6 and extend upward through holes formed in the projections 46, thereby forming guides for said projections as they travel up and down with the sleeve 43 and the shaft 24. The cross-pins 49 serve to limit the upward movement of the parts. Said studs 48 also take the torsional strain produced by the turning of the shaft 24 in one direction or the other, and thereby relieve the valve structures from such strain. The upwardly extending arm 50 of the inverted T-lever 40 is provided at its upper end with gear-teeth adapted to engage corresponding gear-teeth formed on a sleeve 51 as shown in Fig. 2. Said sleeve 51, as shown, is provided with two radially extending arms 52, 52. The sleeve 16 which is secured to the lower section of the thermostat is provided with a downwardly extending projection 16ᵇ, which said projection is secured by screws 53 to the ends of the arms 52.

With this construction, as will be seen, any turning movement of the sleeve 16 under the action of the thermostat will, by the gear connection, be transmitted to the inverted T-lever 40 and hence to the valve structures 34 and 35. As will be further seen, the construction is such that when the sleeve 16 is moved in a direction to raise the valve structure 34, and thus in a direction to open the valves composing the same, the valve structure 35 will be moved in the opposite direction, that is, in the direction of closing the valves forming a part of the same, and vice versa.

As will be further seen the position of both valve-structures 34 and 35 and of the valves composing the same may be adjusted up and down by turning the shaft 24 in one direction or the other, and if desired said shaft may be turned so as to completely close the valves and shut-off entirely both the hot and cold water supplies.

In order to prevent undesirable fluctuations of the controlling valves, it is desirable to provide means for retarding the movements of said valves and so that such movements will be gradual and steady instead of sudden or fluctuating. Various means may be employed for thus retarding the movements of said valves. A preferred means for this purpose consists in employing a dash-pot, which preferably is double-acting as shown in Fig. 2. Located on the opposite side of the sleeve 43 from the inverted T-lever 40 is a bracket 54, which is likewise pivoted to said sleeve. Said bracket 54 may be entirely separate from said lever 40, but it is preferred to make said bracket and lever integral by connecting the same by cross-arms 55 as shown in Figs. 2 and 3. Mounted on said bracket 54 is a cylinder 56, in which a hollow cylindrical piston 57 is adapted to reciprocate, said piston being closed at each end, as shown in Fig. 2. There is an opening in the side of the cylinder 56 and a corresponding opening in the hollow piston 57, through which opening an arm 58 projecting from the sleeve 51 extends. The inner end of said arm 58 is connected by a link 59 with a lug 60 secured to the inner side of one end of the hollow piston as shown in Fig. 2.

The operation of the dash-pot construction above described will be readily understood. As will be seen, when water is admitted into the main chamber 2 the water in said chamber will have access through the openings in the side of the cylinder 56 and in the side of the hollow piston 57 to the interior of said cylinder and piston respectively. It will be understood that there is sufficient clearance between the exterior of the hollow piston and the interior of the cylinder to permit the water to flow between the same and thus into the ends of the cylinder to act upon the closed ends of the piston. As will be seen, whenever the sleeve 51 is turned by the action of the thermostat, the movement of said sleeve and of the parts connected therewith, including the valve structures 34 and 35, will be retarded by the movement of the piston 57 in the cylinder 56, said piston and cylinder constituting a dash-pot for the purpose, and as the water has access to the interior of said cylinder and said piston, said dash-pot acts as a water dash-pot. By the employment of such dash-pot and by reason of the fact that the same is a double-acting dash-pot, the movement of the valves in one direction or the other will be retarded and be thereby made gradual and steady, and sudden or fluctuating movements of said valves be prevented.

Figure 8:
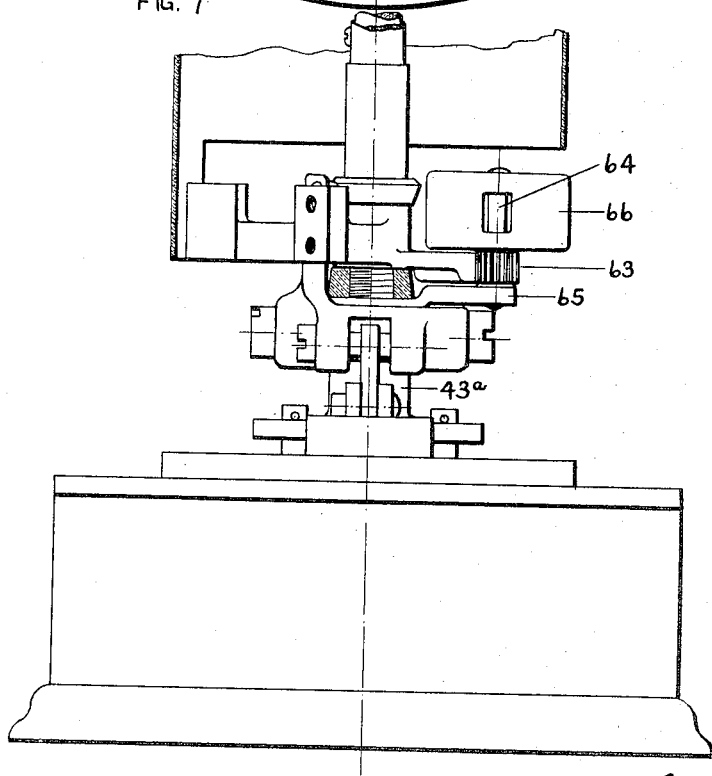
Fig. 8 is a side view of the parts shown in Fig. 7.

In the construction shown in Figs. 8 and 9 a rotary fan-wheel is employed as a retarding means in place of the dash-pot. In this construction the sleeve 51ª is provided with an arm 61 having a segmental gear 62 arranged to engage with a pinion 63 loosely mounted on a stud 64. Said stud 64 is secured in a bracket 65 carried by and projecting from the sleeve 43ª. A fan-wheel 66 is connected to the pinion 63 so as to be rotated thereby. In the drawings this fan-wheel is shown as provided with two plates, but may have a larger number of plates, if so desired.

As shown in Fig. 8 the rotary fan-wheel is located in the main chamber 2 and so that when the water is admitted to said chamber to fill the same, said fan-wheel will be fully immersed in a body of water. Consequently when the sleeve 51ª is turned by the action of the thermostat the movement of said sleeve and of the parts connected therewith, including the valve structures 34 and 35, will be retarded by the rotary action of the fan-wheel in the body of water in which it is immersed, thereby rendering the movements of the controlling valves gradual and steady as in the case of the dash-pot construction previously described.

With the construction above described the temperature of the water to be delivered through the discharge outlet may be varied and regulated by turning the handle 29. By turning said handle the sleeve 23 and the thermostat connected therewith and suspended therefrom will be correspondingly turned, which will serve to change the normal position of the thermostat and also the relative positions of the hot and cold water valves.

It is preferred to provide the valve with a scale showing the degrees of temperature at which the water may be delivered through the discharge outlet. As shown in Fig. 6 such a scale 67 may be conveniently secured to the exterior of the casing at or near the top thereof. It is also preferred to provide means for locking the thermostat in any adjusted position, and for this purpose a segmental plate 68 is secured to the top of the casing as shown in Fig. 4, said plate being provided with a series of notches 69. To the handle 29 a lock-lever 70 is pivoted at 71, as shown in Fig. 5. Said lock-lever is provided with a downwardly extending projection 72, the lower portion of which is narrowed and beveled to form a tooth 73 adapted to engage one of the notches 69, and thereby hold the handle 29 in adjusted position. Preferably a tapered extension 74 extends downwardly from the projection 72 to serve as a pointer to indicate the degree of temperature for which the valve is set as shown in Fig. 6.

Preferably an adjustable stop 75 is mounted on the segmental plate 68, said stop serving to limit the movement of the handle 29 in that direction and thereby insuring that the water shall not be delivered from the discharge outlet above the desired maximum temperature. By adjusting said stop 75 the degree of such maximum temperature of the discharge may be varied.

Within the casing 1 is placed a cylindrical sleeve 76, the lower end of said sleeve fitting over an annular flange 77 formed on the base 6, and the upper end of said sleeve being provided with a series of openings 78. Between the outer wall of said sleeve and the inner wall of the casing 1 is formed an annular space 79, the lower end of which communicates with an opening 80 in the base 6, said opening 80 leading to a chamber 81 from which leads the outlet opening 3. The water entering at the hot and cold water inlets and flowing therefrom into the chamber 2 is caused to flow upward through the coils of the thermostat, thence out through the openings 18, and down through the annular space 79 to the chamber 81 and outlet opening 3.

With the construction above described, as will be seen, the thermostat acts by a rotary movement thereof, and such rotary movement of the thermostat acts through suitable connecting mechanism to move the controlling valves and vary the position thereof as required, as distinguished from constructions in which the thermostat acts merely to determine the extent of movement of the valves when moved by power derived from some other source. As will be further seen, by reason of the fact that the thermostat is suspended within the casing, the rotary movement of the thermostat is practically without friction, and so that substantially the full power due to such rotary movement is available for the operation of the valves.

With the construction shown and described the water is caused to travel upward through the thermostat and by reason of the series of coils employed the streams of hot and cold water are effectively broken up and thoroughly mixed in passing through the manifold passages through the coils. In other words the construction of thermostat employed, in addition to its thermostatic action, also serves as a means for effectively mixing the hot and cold water, and thereby bringing the mixture to a uniform temperature throughout.

What I claim as my invention and desire to secure by Letters Patent is:

1. The combination of a casing provided with fluid inlets, a valve for each of said inlets, a pivoted member connected to said valves and provided with gear teeth, a thermostat adapted to act by a rotary movement, and a sleeve connected to said thermostat and provided with gear teeth adapted to engage the gear teeth on said pivoted member.

2. The combination of a casing provided with fluid inlets, a valve for each of said inlets, a thermostat connected to said valves, and means for retarding the movements of said valves under the action of said thermostat.

3. The combination of a casing provided with fluid inlets, a valve for each of said inlets, a thermostat adapted to act by a rotary movement and connected to said valves, and means for retarding the movements of said valves under the action of said thermostat.

4. The combination of a casing provided with fluid inlets, a valve for each of said inlets, a thermostat suspended in said casing and connected to said valves, and means for retarding the movements of said valves under the action of said thermostat.

5. The combination of a casing provided with fluid inlets, a valve for each of said inlets, a thermostat connected to said valves, and a dash-pot connected with said valves for retarding the movement of the same under the action of said thermostat.

6. The combination of a casing provided with fluid inlets, a valve for each of said inlets, a pivoted member connected to said valves, a thermostat adapted to act by a rotary movement, a gear connection between said thermostat and said pivoted member, and a dash-pot, the piston of which is connected to said gear connection.

7. The combination of a casing provided with fluid inlets, a valve for each of said inlets, a pivoted member connected to said valves and provided with gear teeth, a thermostat adapted to act by a rotary movement, a sleeve connected to said thermostat and provided with teeth adapted to engage the gear teeth on said pivoted member, and a dash-pot, the piston of which is connected to said sleeve.

8. A valve structure comprising a base member provided with an inlet port and an outlet port, a casing secured to said base member, a sleeve within said casing forming an annular space communicating with said outlet port, said sleeve being provided with an opening at its upper end, and a thermostat located within said sleeve.

9. A valve structure comprising a base member provided with inlet ports and an outlet port, valves for controlling the admission of fluid through said inlet ports, a casing secured to said base member, a sleeve within said casing forming an annular space communicating with said outlet port, said sleeve being provided with an opening at its upper end, and a thermostat located within said sleeve.

10. A valve structure comprising a base member provided with inlet ports and an outlet port, valves for controlling the admission of fluid through said inlet ports, a casing secured to said base member, a sleeve within said casing forming an annular space communicating with said outlet port, said sleeve being provided with an opening at its upper end, and a thermostat of coil form located within said sleeve.

11. A thermostat of coil form constructed in sections, each of said sections comprising a plurality of coils.

12. A thermostat of coil form constructed in sections, each of said sections comprising a plurality of coils connected together.

13. A thermostat of coil form constructed in sections, each of said sections comprising a plurality of coils connected together by an outer sleeve.

14. A thermostat of coil form constructed in sections, each section comprising a plurality of coils, and said sections being connected together.

15. A thermostat of coil form constructed in sections, each section comprising a plurality of coils, and said sections being connected together by an inner sleeve.

16. A thermostat of coil form constructed in sections, each of said sections comprising a plurality of coils connected together by an outer sleeve, and said sections being connected together by an inner sleeve.

17. The combination of a casing provided with a fluid inlet, a valve for said inlet, a thermostat for controlling the operation of said valve, and means for retarding the movements of said valve under the control of said thermostat.

18. The combination of a casing provided with fluid inlets, a valve for each of said inlets, a thermostat for controlling the operation of said valves, and means for retarding the movements of said valves under the control of said thermostat.

19. The combination of a casing provided with fluid inlets, a valve for each of said inlets, a thermostat for controlling the operation of said valves and adapted to act by a rotary movement, and means for retarding the movements of said valves under the control of said thermostat.

20. The combination of a casing provided with fluid inlets, a controlling-valve for each of said inlets, a thermostat of coil form for automatically controlling the position of said controlling-valves, a shut-off valve for each of said inlets, and hand-operated means embodying a rod passing through said thermostat for operating said shut-off valves.

21. The combination of a casing provided with fluid inlets, a controlling-valve for each of said inlets, a thermostat of coil form for automatically controlling the positions of said controlling-valves, a pointer connected with said thermostat, a shut-off valve for each of said inlets, hand-operated means embodying a rod passing through said thermostat for operating said shut-off valves, and an operating handle adapted to actuate said rod.

22. The combination of a casing and a thermostat within said casing, comprising coils connected together, said coils being wound in opposite directions.

23. The combination of a casing and a thermostat within said casing, comprising coils connected together and arranged in line with each other.

24. The combination of a casing provided with inlets for fluids of different temperatures, a thermostat within said casing, comprising coils connected together and arranged in line with each other, and means for causing the fluids to pass through said coils.

25. The combination of a casing provided with fluid inlets, a reciprocating valve for each of said inlets, a thermostat of coil form within said casing connected by one end to said valves, and means for adjusting the position of said thermostat connected to the other end of said thermostat.

26. The combination of a casing provided with fluid inlets, a reciprocating valve for each of said inlets, a thermostat of coil form housed within said casing connected by one end to said valves, means for adjusting the position of said thermostat, and a pointer connected with the other end of said thermostat and adapted to indicate upon a scale a temperature for the water corresponding to the adjusted position of said thermostat.

27. In combination in a thermostatic valve, a casing having a pair of inlet passages, a reciprocating valve for each of said passages, a thermostat of coil form housed within said casing, a shaft supported by said casing, a rocking member having a pair of similar and oppositely directed arms, said rocking member being supported from said shaft and connected to said thermostat, and a short link serving to interconnect each of said arms individually with one of said valves.

28. In combination in a thermostatic valve, a casing, a shaft supported by said casing, a rocking member operatively supported by said shaft, a pair of valves supported by said rocking member, and a thermostat, and said thermostat being supported by one end by said casing and by the other end by said shaft, and being operatively connected with said rocking member.

29. In a thermostatic valve, a casing, a shaft supported for rotation by said casing, a rocking member operatively supported by said shaft, a pair of valves supported by said rocking member, a thermostat housed within said casing and connected with said rocking member, and means housed within said casing for limiting such rotation of the shaft.

30. In combination in a thermostatic valve, a casing provided with a pair of inlets, a reciprocating valve for each of said inlets, a separate and individual stem for each of said valves, a thermostat adapted to operate by a rotary movement, and a rocking member serving to interconnect said thermostat and stems.

31. In combination in a thermostatic valve, a casing having a pair of inlets having valve seats and valves extended through said inlets having means for cooperating with said seats, a thermostat of coil form for positioning said valves, and a shaft supported by said casing and extending through said thermostat, and means responsive to the rotation of said shaft for effecting the seating of said valves on said seats.

32. In combination in a thermostatic valve, a casing having a pair of inlet openings that are provided with valve seats, a valve for each of said openings, a thermostat of coil form connected with said valves, an index finger connected with said thermostat, a shaft supported by said casing and extending through said thermostat, and means responsive to rotation of said shaft for moving said valves relatively to said seats.

33. A thermostatic valve comprising a casing, a shaft extended through the wall of said casing, a thermostat of coil form housed within said casing, means for supporting one end of said thermostat from said wall and having limited rotative movement concentric with said shaft, and a sleeve-device mounted for free rotation on said shaft operatively connected with the other end of said thermostat.

FREDERICK C. LEONARD.

Witnesses:
CHARLES R. FREEMAN,
CHARLES E. FREEMAN.